United States Patent Office 3,454,604
Patented July 8, 1969

3,454,604
PROCESS FOR THE MANUFACTURE OF 1-AMINO-4-HYDROXYANTHRAQUINONE
John Hampton Shown, Westfield, and Ronald Saylor Tyson, Piscataway, N.J., assignors to GAF Corporation, a corporation of Delaware
No Drawing. Filed July 6, 1966, Ser. No. 563,070
Int. Cl. C07c 97/14
U.S. Cl. 260—380                 7 Claims

ABSTRACT OF THE DISCLOSURE 1-amino-4-hydroxyanthraquinone is produced in high yield and purity by reacting essentially equimolar amounts of leuco quinizarin (1,4-dihydroxyanthraquinone) and a 1,1-dialkylhydrazine in an inert solvent, such as a lower alkanol of 1 to 4 carbon atoms, at a temperature of from about 50 to about 150° C.

---

1-amino-4-hydroxyanthraquinone has been a well known compound for many years. It is listed in the Color Index as C.I. Disperse Red 15, C.I. No. 60710 and is used both as a dyestuff and intermediate.

A number of methods have been devised and applied to the manufacture of 1-amino-4-hydroxyanthraquinone. Among them are: Nitration of 1-methoxy or 1-hydroxy anthraquinone, followed by reduction and hydrolysis of the methoxy compound when that is used; hydrolysis of 1 benzamido-4-chloro anthraquinone; oxidation of 1,4-diamino-2,3-dihydro anthraquinone; hydrolysis of 1,4 diamino-2,3-dihydro anthraquinone; reaction of leuco quinizarin with ammonia; and hydrolysis of 1 hydroxy-4-benzamido-anthraquinone.

This invention relates to a novel and improved method for the preparation of 1-amino-4-hydroxyanthraquinone. It has been found that when leuco quinizarin is reacted with a 1,1-dialkyl hydrazine a nearly quantitative yield of 1-amino-4-hydroxyanthraquinone of an exceedingly high purity is obtained.

In brief, in accordance with the present invention leuco quinizarin is reacted with a 1,1-dialkyldrazine of the formula

wherein each R represents an alkyl radical of from 1 to 4 carbon atoms, and preferably is methyl, in an inert solvent. In order to complete the reaction in a reasonable time the reaction is preferably carried out at a slightly elevated temperature, our preferred temperature range being 50 to 115° C. The reaction is advantageously carried out at reflux temperature so that an inert solvent boiling between 50 and 115° C. is particularly preferred. We particularly prefer the lower alkanols of 1 to 4 carbon atoms, i.e. methanol, ethanol, isopropanol, butanol, isobutanol and t-butanol. As examples of other inert solvents which can be used may be mentioned aromatic hydrocarbons, such as benzene, toluene and chlorobenzene or aliphatic hydrocarbons, such as petroleum ethers, heptane, isooctane, and the like.

This method has many advantages over the methods previously employed for the preparation of this dyestuff. Among them are, inexpensive and readily available starting materials, high yields, high purity of product and very simple and convenient operations. In addition, as a result of its high purity, the product has a very high dyeing strength on cellulose acetate along with unusual brightness of shade.

When these features are compared with those of the previously known methods, it is apparent that our invention provides a decidedly superior overall method for the preparation of 1-amino-4-hydroxyanthraquinone.

The reaction with leuco quinizarin is very specific for 1,1-dialkylhydrazines. Monosubstituted and 1,1-disubstituted hydrazines of other types, such as 1,1-diphenyl hydrazine, as well as hydrazine itself fail to produce any detectable amount of 1-amino-4-hydroxy anthraquinone under these conditions.

Most advantageously, 1,1-dimethyl hydrazine is employed in either ethanol or isopropanol.

The following examples illustrate the invention.

EXAMPLE 1

(A) Preparation of leuco quinizarin

In a 5 l. flask 333 g. anhydrous sodium carbonate are added to 3200 ml. water. The mixture is heated to 70–72° C. and 250 g. quinizarin added followed by 290 g. sodium hydrosulfite. Heating is maintained at 70–72° for 7 hours after the addition is complete. At the end of this time the reaction mixture is allowed to cool to room temperature and stirred for 12 hours. It is filtered and the product washed free of base with cold water. After drying at 90° C. the product (leuco quinizarin) consists of 241.0 g. of light yellow material. This represents 95.7% of the theoretical yield.

(B) Preparation of 1-amino-4-hydroxyanthraquinone

To 200 ml. ethanol is added 6.0 g. (0.1 mole) 1,1-dimethylhydrazine and 24.2 g. (0.1 mole) of the leuco quinizarin recovered as the product from A above. The reaction is heated to reflux and held there 4½ hours. It is then cooled to 25° C. and the product collected by filtration. The product is washed with 150 ml. ethanol and then dried at 90° C. There was recovered 22.6 g. of 1-amino-4-hydroxyanthraquinone in the form of a red brown powder. This represents 95% of the theoretical yield.

The 1-amino-4-hydroxyanthraquinone product when dispersed and applied to cellulose acetate in the customary dyeing methods was considerably to much brighter than standard Dispersed Red 15. The behavoir upon chromatographic examination was similar to standard but indicated a purer product than the commercial type. Infrared curves were similar but showed our product again to be of higher purity than the commercially available type. A melting point of 209–215° C. was obtained, comparable to the 211–212° C. reported in the literature for highly purified 1-amino-4-hydroxyanthraquinone.

Essentially similar results were obtained when 200 ml. of isopropanol was employed as the solvent in place of ethanol.

EXAMPLE 2

To 200 ml. of toluene is added 48.4 g. of the leucoquinizarin recovered as product in Part A of Example 1 above, and 18.2 g. of 1,1-dimethylhydrazine. The mixture is heated at 80° C. for 8½ hours. The toluene is then removed by steam distillation and the remainder of the mixture is cooled and filtered. The residue is washed thoroughly with water and dried. There was recovered 49 g. of 1-amino-4-hydroxyanthraquinone in the form of a red brown powder very similar to the product produced in Example 1(B) above.

Similar results were obtained using benzene and chlorobenzene as solvent in place of toluene.

It will be apparent that the above examples illustrate a preferred embodiment of the present invention, but various modifications which will suggest themselves to those skilled in the art may be made therein without de-

We claim:
1. A process for the production of 1-amino-4-hydroxy-anthraquinone comprising reacting essentially equimolar amounts of leuco quinizarin and a 1,1-dialkylhydrazine of the formula

wherein each R represents an alkyl radical of from 1 to 4 carbon atoms in an inert solvent at a temperature of from about 50 to about 115° C. and recovering the thus produced 1-amino-4-hydroxyanthraquinone.

2. The process as defined in claim 1 wherein the 1,1-dialkyl hydrazine is 1,1-dimethyl hydrazine.

3. The process as defined in claim 1 wherein the inert solvent is an alkanol having from 1 to 4 carbon atoms.

4. The process as defined in claim 3 wherein the 1,1-dialkyl hydrazine is 1,1-dimethyl hydrazine.

5. The process as defined in claim 4 wherein the alkanol is ethanol.

6. The process as defined in claim 4 wherein the alkanol is isopropanol.

7. The process as defined in claim 1, wherein the solvent is toluene.

References Cited

Beilstein: Org. Chemie (Hauptwerke), vol. 14, p. 268 (1931) (incorporating by reference German patent to Bayer, 94,396).

LORRAINE A. WEINBERGER, *Primary Examiner.*

H. C. WEGNER, *Assistant Examiner.*